United States

Hirose

[11] 4,009,942
[45] Mar. 1, 1977

[54] ZOOM LENS DEVICE
[75] Inventor: Ryusho Hirose, Machida, Japan
[73] Assignee: Canon Kabushiki Kaisha, Tokyo, Japan
[22] Filed: May 1, 1975
[21] Appl. No.: 573,562
[30] Foreign Application Priority Data
   May 9, 1974  Japan .............. 49-51493
[52] U.S. Cl. .................... 350/184; 350/39; 350/176; 350/183; 350/196
[51] Int. Cl.² .................................. G02B 15/06
[58] Field of Search ........... 350/184, 176, 196, 38, 350/39, 183, 187; 354/197

[56] References Cited
UNITED STATES PATENTS

| | | | |
|---|---|---|---|
| 2,632,370 | 3/1953 | Shepard | 354/197 |
| 2,940,373 | 6/1960 | Beng et al. | 350/187 X |
| 3,293,357 | 12/1966 | Doi et al. | 350/39 X |
| 3,547,521 | 12/1970 | Ichizuka et al. | 350/184 X |

*Primary Examiner*—Paul A. Sacher
*Attorney, Agent, or Firm*—William R. Woodward

[57] ABSTRACT

A zoom lens device comprises a zooming section including a group of focusing lenses, a group of variator lenses and a group of compensator lenses, and a relay section for focusing the light beam from the zooming section. The zoom lens device permits its zooming section alone to be interchanged with another zooming section. By fitting this other zooming section to the relay section, the zoom lens device having different magnification, and so on can be obtained. The light beam from this other zooming section is substantially equal in aberration and image forming conditions to the light beam from the original zooming section.

8 Claims, 8 Drawing Figures

ZOOM LENS DEVICE

BACKGROUND OF THE INVENTION

1. Field of the Invention

This invention relates to a zoom lens device of a type, in which, by interchanging the zooming section alone with a fixed part (or relay section) remaining as it is, the same result is obtained as in the case of interchanging the lens system as a whole.

2. Description of the Prior Art

In a picture-taking apparatus or the like, when it is desired to carry out photographic operations by interchanging lenses having different magnification, etc., there are three known methods, namely, a first one is to interchange the entire lens system, a second one is to connect a separate lens, for example, an afocal converter lens to the existing lens system, and a third one is to interchange only a part of the lens system with another lens.

The lens device of the present invention pertains to the third method mentioned above. However, this third method has heretofore been adopted for interchange of monofocal lenses, and not for the interchange of zoom lenses. The reason is that since zoom lenses have been designed primarily to minimize variations in aberration to occur in the zooming section during the zooming operation, and secondly to correct, at the relay section, the aberration occurring in the zooming section, it has been regarded as impossible to assemble another zooming section to the relay section.

On the other hand, in the field of TV cameras, miniaturization of the optical system has been desired as in the case of emergence of handy or compact camera.

SUMMARY OF THE INVENTION

An object of the present invention is to provide a zoom lens device which permits interchange of the zooming section.

This object can be achieved by equalizing the aberration and image formation conditions of light beams from respective zooming sections including a group of focusing lenses, a group of variator lenses and a group of compensator lenses, and by directing the light beams from these zooming sections to the fixed relay lens section.

The foregoing object and other objects of the present invention as well as construction and function of the device according to the present invention will become more apparent from the following detailed description thereof, when read in conjunction with the accompanying drawing.

DESCRIPTION OF THE PREFERRED EMBODIMENTS

In order to equalize the aberration and image-forming conditions, a group of fixed lenses which do not move at the time of the zooming operation are disposed behind a group of moving lenses.

More specifically, when the aberration and image-forming conditions of the light beam from a reference zooming section are assumed to be at certain values, a group of fixed lenses which do not move at the time of the zooming operation are disposed behind a group of lenses, the zooming section of which moves, with a view to setting the aberration and image forming conditions of light beam from the zooming section to be interchanged at the above-mentioned certain values. The reason for such an arrangement is the difficulty in bringing the aberration and image-forming conditions to such certain values by means of the focusing lens group, variator lens group and compensator lens group, from the design standpoint.

The aperture means for determining the F-number is disposed at either the front or the rear side of the fixed lens group, and it is located within the focal length of the fixed lens alone. That is, by providing the aperture means adjacent to the fixed lens group, the diameter of the focusing lens can be reduced, whereby reduction in the quantity of marginal light is avoided. Desirably, this "fixed" lens group should be axially movable back and forth along the optical axis. By adopting the above-described arrangement, it becomes possible to correct the image-forming condition of the light beam from the zooming section.

It is also desirable that this fixed lens group be composed of at least a group of convex lenses and a group of concave lenses.

This is because, when the spherical aberration created in the zooming section is under-corrected, the group of the concave lenses having a higher refractive index than that of the group of the convex lenses is used to cause the concave lens group to have the function of diverging the light beam, whereby the spherical aberration is able to be over-corrected by the fixed lens group. Thus, correction of the spherical aberration can be easily accomplished.

When the spherical aberration created in the zooming section is found over-corrected, the fixed lens group may be constructed in reverse to the above.

Also, the fixed lens group may comprise at least two groups of concave and convex lenses.

When the fixed lens group is positive, the concave lens group should desirably be formed of a glass having a higher dispersibility than that of the convex lens group, and, when the fixed lens group is negative, the concave lens group should desirably be formed of a glass having a lower dispersibility than that for the convex lens group. By employing such construction, it is possible to correct any axial chromatic aberration created in the zooming section.

More specifically, when the axial chromatic aberration in the zooming section is under-corrected, it is feasible to correct such under-correction in the zooming section by using a glass of a high dispersibility for the concave lens group of the fixed lens group including two groups of concave and convex lenses, and by using a glass of a low dispersibility for the convex lens group of the fixed lens group. Conversely, any over-correction of the axial chromatic aberration may be corrected by inverting the choice of the glass materials.

Also, it is advantageous if the fixed lens group may be constructed in an afocal optical system. This will alleviate the image-forming condition of the light beam from the fixed lens group. Further, use of the afocal optical system including two groups of concave and convex lenses will result in the following advantage.

The focal length of the entire zoom lens is represented as follows.

$$f = f_1 V_K \frac{f_R}{f_A},$$

where:
- $f$ is a focal length of the entire system;
- $f_1$ is a focal length of the focusing lens;
- $f_A$ is a focal length of the lens in the afocal system;
- $f_R$ is a focal length of the relay lens system; and
- $V_K$ is an image magnification of the variator lens and compensator lens.

Therefore, if $f_A$, or the concave lens in the afocal lens system, is located nearer to the object side than the convex lens, the position of the principal point of the afocal lens system will shift beyond the relay lens system to eliminate a space for the compensator, so that the focal length $f_A$ will be elongated and the zoom system will shift to the side of a wide-angle. That is, positioning of the concave lens to the object side in case of a wide-zoom, and positioning of the same to the image-plane side in case of telescopic-zoom, will be more advantageous than attempting the shift to the wide-angle side (i.e. widening of the zoom angle) with only a zooming section of the zoom lens.

From the foregoing description, it will be appreciated that the spherical and axial chromatic aberrations can be corrected by the fixed lens group.

Further, in the zoom lens device of the present invention, coma and chromatic aberrations of magnification created at the time of zooming may be corrected by constructing the variator lens group in the manner as described hereinbelow.

It is desirable that at least one negative lens be included in the variator lens group in the reference zooming section, and that at least one negative lens and a negative meniscus lens, with its concave surface being faced to the object side, be included in the variator lens group in the zooming section to be replaced on the image plane side of the negative lens.

By such construction, it becomes possible to correct, at the time of zooming, both the inward coma created on the wide-angle side and the outward coma created on the telephoto side. If the negative meniscus lens faces in the opposite direction, distortion can well be corrected, but the coma aberration varying with the zooming can not be corrected. It is also intended that the distortion created on the wide-angle side be corrected by incorporating an oppositely facing negative meniscus lens in the compensator of another zoom lens to be replaced.

An ordinary zooming lens is so designed that the coma aberration which varies with zooming operation is divided into two sides, the wide-angle side and the telephoto side. At the wide angle side, the inward coma aberration is made as small as possible, and, at the telephoto side, the outward coma aberration is made as small as possible to thereby minimize variations in coma aberration resulting from the zooming operation, and to minimize variations in distortion at aberration by controlling the distortion at the wide-angle side in the form of a barrel (negative) and distortion at the telephoto side in the form of a bobbin (positive), whereby the deflected aberration is corrected by a relay lens.

However, in the system according to the present invention, the proper aberration in the zooming section to be interchanged cannot be corrected by the relay section, hence occurrence of such proper aberration must be eliminated primarily. To attain this objective therefore, the variator lens is constructed as mentioned in the foregoing, whereby marginal light beam passes through a lower position in the negative meniscus lens at the time of zooming to the wide-angle side. On account of this, correction of the distortional aberration and the coma aberration becomes possible. Also, in order to reduce variations in chromatic aberration due to magnification during zooming and to reduce the aberration itself, if this oppositely facing meniscus lens is formed as a doublet, the designing will become much easier, and there can be obtained an interchangeable zoom lens of high performance for the zooming section.

It is also desirable that the focusing lens group be so constructed that it includes a biconvex lens and a positive meniscus lens disposed behind this biconvex lens. By this, it becomes possible to correct astigmatism on both wide-angle and telephoto sides.

Unless such arrangement is adopted, the astigmatism on the telephoto side, in particular, will be over-corrected, and the image-forming performance becomes remarkably deteriorated. If any other lens group than the focusing lens group should be used for this correction, the astigmatism on the wide-angle side will then be remarkably under-corrected to result in an insufficient image-forming performance.

It is also desirable that the focusing lens group comprise a concave lens group and a convex lens group disposed behind the concave lens group and that the radius of curvature of the concave lens group at its image plane side be smaller than that at the object side of the convex lens group. By such construction, it is possible to prevent the spherical aberration, especially on the telephoto side, from being under-corrected, when the lens device is focused on an object lying in a short distance. Especially, in an interchangeable lens for the zooming section, if it is attempted to correct the entire aberration by the zooming section alone, load will naturally be imparted also to the focusing portion with the consequence that aberration is rather created in the focusing portion to correct the entire aberration (including variations in the aberration due to zooming). On account of this, when a short distance has been attained as the result of focussing, the spherical aberration, especially on the telephoto side, will be remarkably under-corrected, which will constitute a disadvantage in the interchanging zoom lens for the zooming section in the designed distance of an object to be photographed.

The invention will be more fully explained in the following in reference to preferred embodiment as shown in the drawing.

Figure 1:
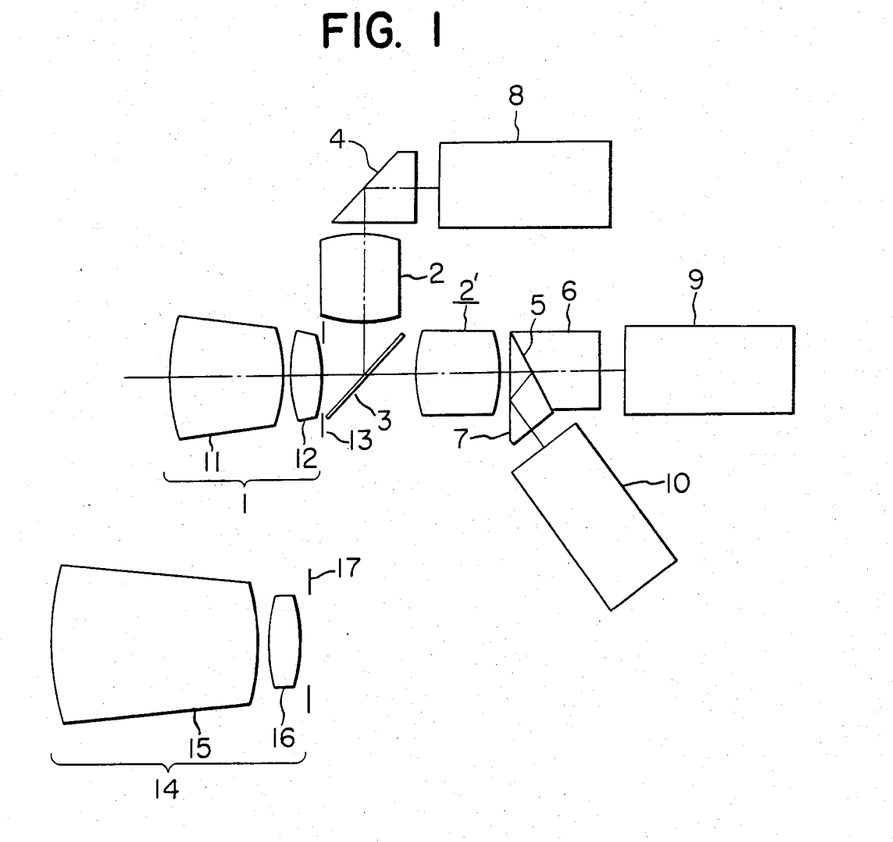
FIG. 1 is schematic diagram showing arrangement of the optical system for the zoom lens device of the present invention.

Referring to FIG. 1 which shows an embodiment of the present invention as applied to a color television camera, the optical system of the zoom lens device essentially consists of a first zooming section 1, and a first and second relay lens section 2, 2'. Between the first zooming section 1 and the relay lens sections 2, 2', there is disposed a first dichroic layer 3. Disposed behind the first relay lens section 2 is a prism block 4 having a reflecting surface. A prism block 6 having a second dichroic layer 5 is disposed behind the second relay lens section 2'. The prism block 6 also has a reflective surface 7 for reflecting the light reflected by the second dichroic layer 5. Reference numerals 8, 9 and 10 designated red, green and blue pickup tubes, each being connected to the optical system in alignment with each prism block.

The zooming section comprises: a part 11 including a group of focusing lenses, a group of variator lenses, and a group of compensator lenses; group of afocal lens group 12; and an aperture means 13. The light from the afocal lens group 12 is first resolved by the first dichroic layer 3 into a reflected color component and a transmitted color component. The reflected color component is focused on the plane of the pickup tube 8 by the first relay lens 2.

Light which contains the remaining color components that have been transmitted and separated through the first dichroic layer 3 passes through the second relay lens group 2' and enters into the second dichroic layer 5 where this incident light is further resolved into a reflected light and a transmitted light. The reflected light is further reflected by the reflecting surface of the prism block 6 to form a monochromatic component image on the plane of the pickup tube 10. On the other hand, the transmitted light forms a monochromatic image on the plane of the pickup tube 9.

A second zooming section 14 comprises: a part 15 including a group of focusing lenses; a group of variator lenses and a group of compensator lenses; a group of afocal lenses 16; and an aperture means 17. While this second zooming section differs from the first zooming section in its zoom ratio, the aberrations of the afocal light beam projecting from these two zooming sections are substantially equal even when the zooming operation is performed. Therefore, the first and the second zooming sections are interchangeable each other.

Figure 2:
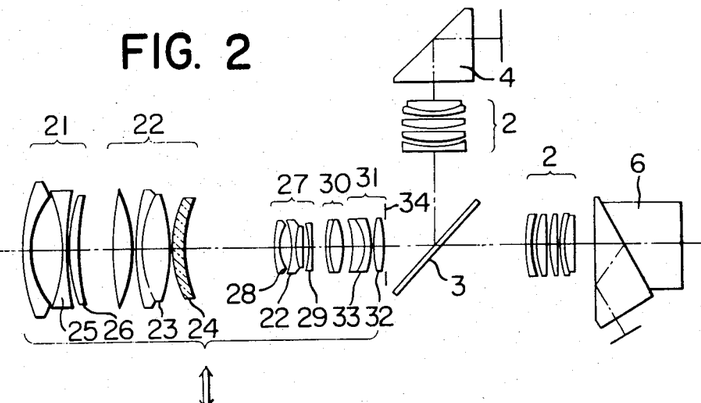
FIGS. 2 to 5 are schematic views showing practical examples of the interchangeable lenses according to the present invention.
Figures 3, 4:
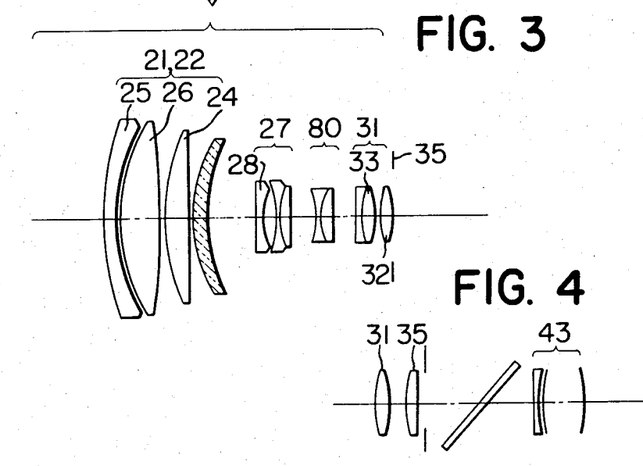

FIGS. 2 to 4 shows some practical examples of the zoom lens device shown in FIG. 1. Particularly, the FIG. 2 example shows a wide angle zoom of six times magnification.

In FIG. 2, a group of the focusing lenses is constructed with groups of concave lenses convex lenses 21, 22. The focusing lens group includes therein a biconvex lens 23 which may be a doublet. Disposed behind the lens 23 is a positive lens 24. The first and the second surfaces of this positive lens (in the drawing, this is a positive meniscus lens) is in the relationship of $R_1 R_2$, where $R_1$ is the radius of curvature of the first surface and $R_2$ is that of the second surface. With this lens, it becomes possible to correct astigmatism on both the wide-angle and the telephoto sides. Focusing operation is done by causing either group of lenses to protrude frontward and backward. This enables picture-taking even at an extremely short distance, say, 1 meter, and also permits a reduction in size of the lens system. Further, in the lens group 21 of the focusing lens, to perform the focusing operation, there is disposed a concave lens 25 and a convex lens 26 behind it, the image plane side of the concave lens 25 having a radius of curvature greater than that of the object side of the convex lens.

Designated by 27 is a group of variator lenses. The variator lens group 27 has at least one negative lens 28, and a negative meniscus lens 29 with its concave surface being faced to the object side is disposed on the image plane side of the variator lens group. Numeral 30 designates a group of compensator lenses, and 31 a group of afocal lenses. The afocal lens group comprises at least a convex lens group 32, and a concave lens group 33. The concave lens group 33 is formed of a glass having a higher dispersibility than that of the convex lens group 32. The afocal lens group 31 is movable along the optical axis. Numeral 34 designates an aperture means disposed behind the afocal lens group 31. This aperture means 34 may alternatively be disposed in front of the afocal lens group 31. FIG. 3 shows a high magnification zoom lens system of 10 times. In the specific examples shown in FIGS. 2 and 3, all of the relay lenses 2, 2' are disposed on that side which is adjacent the camera, but if required, a part 35 of the relay section may be disposed to the side of the interchangeable lens, as shown in FIG. 4.

Figure 5:
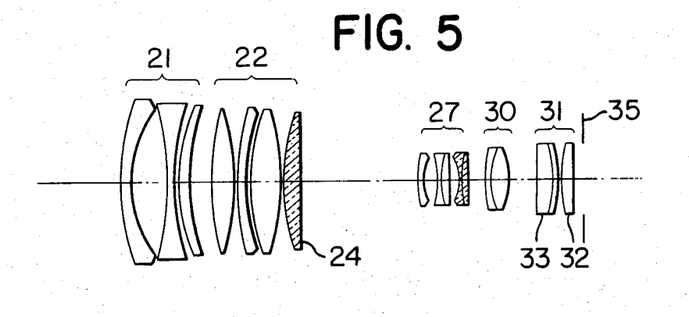
Figure 6:
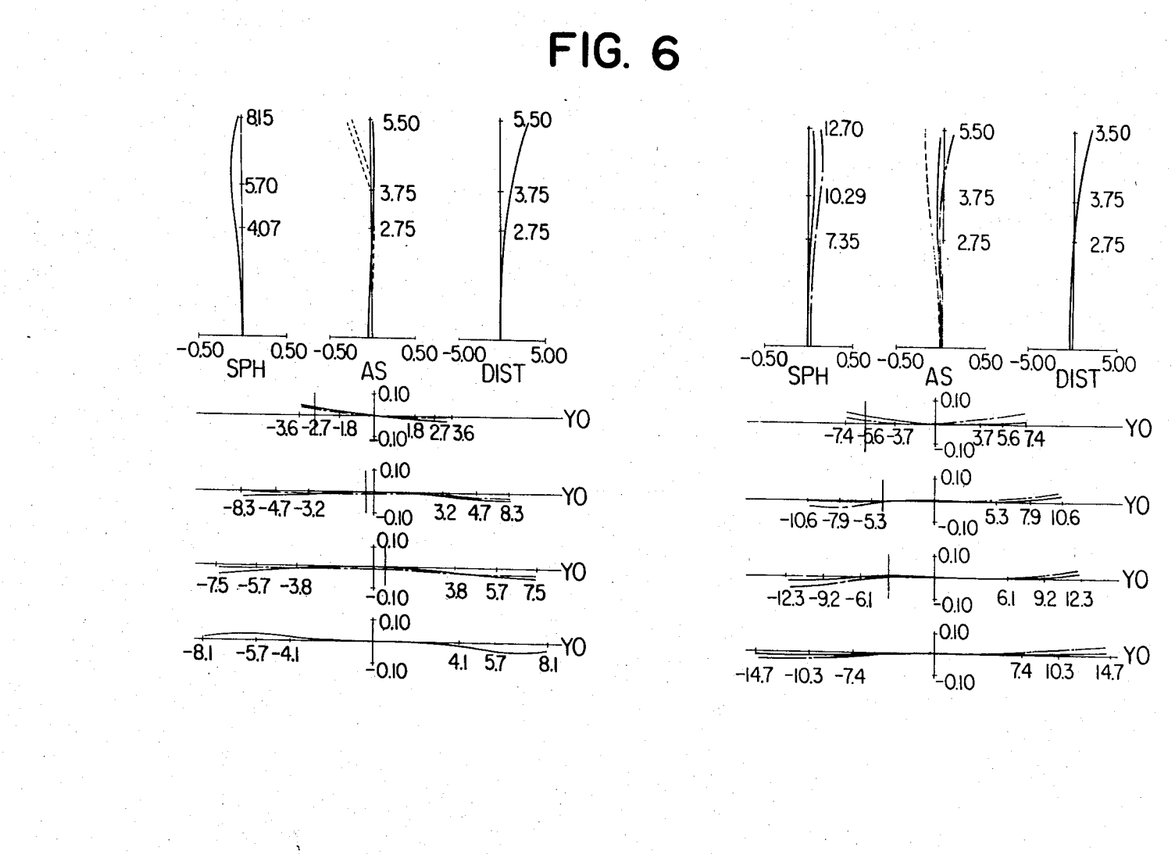
FIGS. 6 to 8 are respectively graphical representation showing the aberrations curves in the interchangeable lenses of FIGS. 2 to 5.
Figure 7:
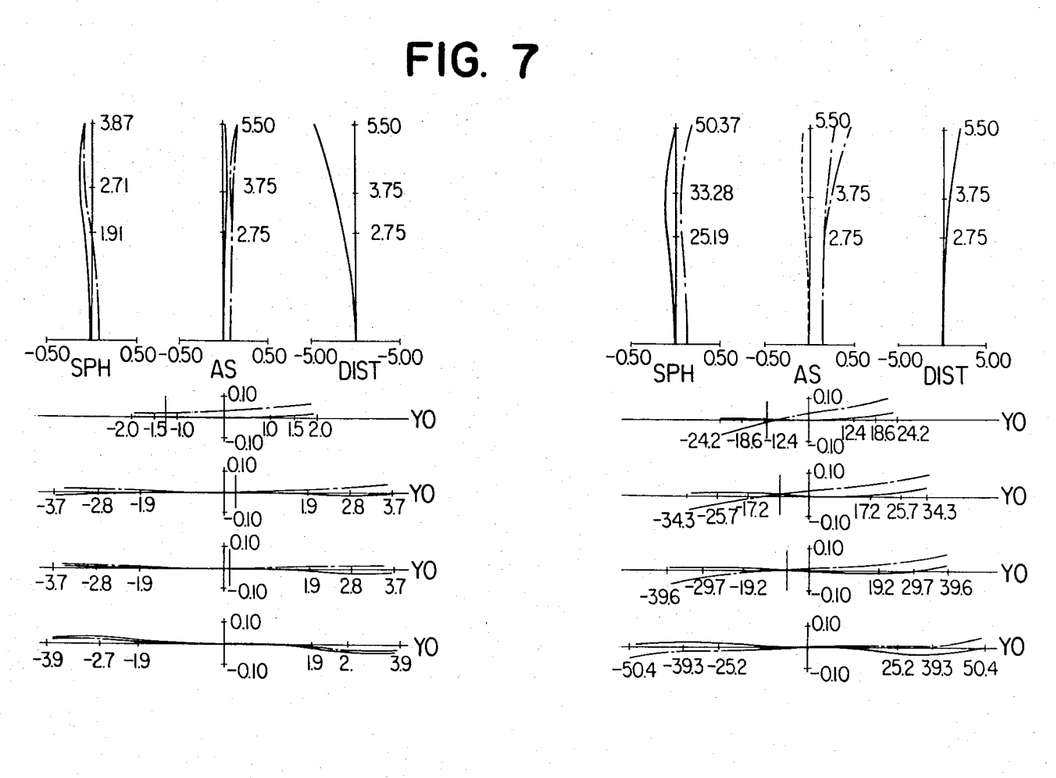
Figure 8:
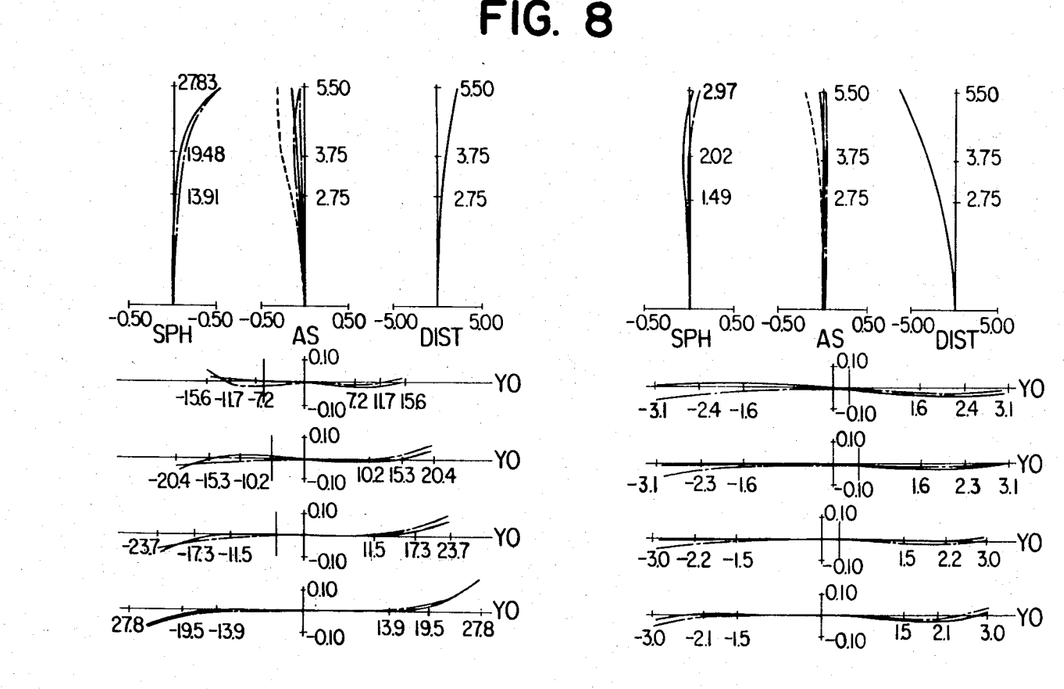

FIG. 5 shows an interchangeable lens with a large zoom ratio and a large angle of view.

The specific numerical data for the lenses shown FIGS. 2, 3 and 5 are shown in the tables below.

Table 1

| | Radius of curvature | Lens thickness | Inter-surface spacing | Glass used | |
|---|---|---|---|---|---|
| | | | | Refractive Index. | Dispersion |
| 1 | 87.9 | 2.5 | — | — | — |
| 2 | 34.0 | — | 12.8 | 1.6968 | 53.7 |
| 3 | −79.1 | 2.25 | — | — | — |
| 4 | 143.6 | — | 0.2 | 1.6516 | 58.6 |
| 5 | 62.6 | 5 | — | — | — |
| 6 | 123.3 | — | 15.5 | 1.69895 | 30.1 |
| 7 | 398.7 | 7.75 | — | — | — |
| 8 | −64.4 | — | 0.2 | 1.56873 | 63.1 |
| 9 | 85.2 | 2.5 | — | — | — |
| 10 | 41.1 | 14.25 | — | 1.80518 | 25.4 |
| 11 | −115.3 | — | 0.2 | 1.56873 | 63.1 |
| 12 | 39.5 | 5.5 | — | — | — |
| 13 | 75.5 | — | $l_1$ | 1.48749 | 70.1 |
| 14 | 53.5 | 1 | — | — | — |
| 15 | 17.6 | 5.6 | — | 1.7725 | 49.6 |
| 16 | −19.2 | 0.9 | — | — | — |
| 17 | 24.4 | 3.3 | — | 1.8160 | 46.8 |
| 18 | −144.7 | 2 | — | 1.92286 | 21.3 |
| 19 | −38.9 | 1 | — | — | — |
| 20 | −627.9 | — | $l_2$ | 1.6968 | 55.7 |
| 21 | 117.9 | 1 | — | — | — |
| 22 | 34.6 | 6.25 | — | 1.7552 | 27.5 |
| 23 | −35.3 | — | $l_3$ | 1.6228 | 57.0 |
| 24 | −44.1 | 7 | — | — | — |
| 25 | −20.9 | 1.5 | — | 1.53256 | 45.9 |
| 26 | −40.6 | — | 0.2 | 1.80610 | 40.8 |
| 27 | 121.4 | 8 | — | — | — |

Table 1-continued

| | Radius of curvature | Lens thickness | Inter-surface spacing | Glass used | |
|---|---|---|---|---|---|
| | | | | Refractive Index. | Dispersion |
| 28 | −64.8 | — | 55 | 1.53256 | 45.9 |
| 29 | 210.5 | 1.8 | — | — | — |
| 30 | 41.4 | — | 1 | 1.80610 | 40.8 |
| 31 | 43.8 | 8.25 | — | — | — |
| 32 | −156.9 | — | 0.2 | 1.60311 | 60.7 |
| 33 | 65.9 | 4.25 | — | — | — |
| 34 | 202.1 | — | 0.65 | 1.48749 | 70.1 |
| 35 | 51.4 | 1.5 | — | — | — |
| 36 | 29.4 | 8 | — | 1.80518 | 25.4 |
| 37 | −185.2 | — | — | 1.62280 | 57.0 |

| | f = 8.5 | f = 55 |
|---|---|---|
| $l_1$ | 0.92 | 45.42 |
| $l_2$ | 0.75 | 2.08 |
| $l_3$ | 47.97 | 2.14 |

Table 2

| | Radius of Curvature | Lens thickness | Inter-surface spacing | Glass used | |
|---|---|---|---|---|---|
| | | | | Refractive index | Dispersion |
| 1 | 131.9 | 4 | — | — | — |
| 2 | 76.2 | — | 1.85 | 1.69895 | 30.1 |
| 3 | 77.2 | 18 | — | — | — |
| 4 | −352.4 | — | 0.2 | 1.43387 | 95.1 |
| 5 | 85.1 | 12.9 | — | — | — |
| 6 | −367.6 | — | 0.2 | 1.43387 | 95.1 |
| 7 | 65.4 | 4.5 | — | — | — |
| 8 | 70.7 | — | $l_1$ | 1.69680 | 55.7 |
| 9 | ∞ | 1.5 | — | — | — |
| 10 | 27.2 | — | 8.55 | 1.713 | 54 |
| 11 | −39.8 | 1.5 | — | — | — |
| 12 | 27.5 | 5.5 | — | 1.713 | 54 |
| 13 | 307.9 | — | $l_2$ | 1.80518 | 25.4 |
| 14 | −34.7 | 1.25 | — | — | — |
| 15 | 25.8 | 4.65 | — | 1.80610 | 40.8 |
| 16 | −689.9 | — | $l_3$ | 1.80518 | 25.4 |
| 17 | −306.5 | 1.5 | — | — | — |
| 18 | 40.5 | 8 | — | 1.69895 | 30.1 |
| 19 | −48.7 | — | 0.2 | 1.51633 | 64.1 |
| 20 | 75.7 | 4.5 | — | — | — |
| 21 | −85.8 | — | 55 | 1.67003 | 47.3 |
| 22 | 210.5 | 1.8 | — | — | — |
| 23 | 41.1 | — | 1 | 1.80610 | 40.8 |
| 24 | 43.8 | 8.25 | — | — | — |
| 25 | −156.9 | — | 0.2 | 1.60311 | 60.7 |
| 26 | 65.9 | 4.25 | — | — | — |
| 27 | 202.1 | — | 0.65 | 1.48749 | 70.1 |
| 28 | 51.4 | 1.5 | — | — | — |
| 29 | 29.4 | 8 | — | 1.80518 | 25.4 |
| 30 | −185.2 | — | — | 1.62280 | 57.0 |

| | f = 11mm | f = 110mm |
|---|---|---|
| $l_1$ | 0.29 | 60.06 |
| $l_2$ | 61.77 | 2.00 |
| $l_3$ | 3.98 | 3.98 |

Table 3

| | Radius of curvature | Lens thickness | Inter-surface spacing | Glass used | |
|---|---|---|---|---|---|
| | | | | Refractive Index. | Dispersion |
| 1 | 131.2 | 4 | — | — | — |
| 2 | 51.36 | — | 16 | 1.69680 | 55.7 |
| 3 | −142.05 | 3.5 | — | — | — |
| 4 | 133.8 | — | 0.2 | 1.67000 | 57.4 |
| 5 | 79.59 | 6.25 | — | — | — |
| 6 | 117.96 | — | 9.5 | 1.69895 | 30.1 |
| 7 | 177.14 | — | — | — | — |
| 8 | −95.14 | 9.75 | — | 1.43387 | 95.1 |
| 9 | 137.16 | — | 0.2 | — | — |
| 10 | 65.65 | 3.5 | — | 1.80518 | 25.4 |
| 11 | 70.36 | — | 1 | — | — |
| 12 | −148.3 | 17.5 | — | 1.43387 | 95.1 |
| 13 | 81.58 | — | 0.2 | — | — |
| 14 | −370.6 | 6.85 | — | 1.71300 | 54.0 |
| 15 | 69.6 | — | $l_1$ | — | — |
| 16 | 22.39 | 1.25 | — | 1.77250 | 49.6 |
| 17 | −62.36 | — | 7.05 | — | — |
| 18 | 36.1 | 1 | — | 1.77250 | 49.6 |
| 19 | 874.6 | 4 | — | — | — |
| 20 | −22.06 | — | 2.5 | 1.92286 | 20.9 |
| 21 | 48.8 | 1 | — | — | — |

Table 3-continued

| | Radius of curvature | Lens thickness | Inter-surface spacing | Glass used | |
| --- | --- | --- | --- | --- | --- |
| | | | | Refractive Index. | Dispersion |
| 22 | −385.4 | 3 | — | 1.77250 | 49.6 |
| 23 | 145.24 | 1.6 | $l_2$ | 1.80518 | 25.4 |
| 24 | 41.8 | 8 | — | 1.75520 | 27.5 |
| 25 | −35.9 | — | — | 1.60311 | 60.7 |
| 26 | ∞ | — | $l_3$ | — | — |
| 27 | −34.1 | 7.5 | — | 1.48749 | 70.1 |
| 28 | −109.15 | 1.25 | — | 1.77250 | 49.6 |
| 29 | 94.38 | — | 0.2 | — | — |
| 30 | −696.4 | 8 | — | 1.66680 | 33.0 |

I claim:

1. A zoom lens comprising:
a first zooming section having a predetermined value of aberration affecting its image forming capability, said first zooming section including a group of focusing lenses, a group of variator lenses and a group of compensator lenses, which lenses together reduce the aberration of the system substantially to said predetermined value;
a second zooming section having the same predetermined value of aberration affecting its image forming capability as said first zooming section, said second zooming section including a group of focusing lenses, a group of variator lenses, a group of compensator lenses, and a group of normally fixed lenses, which lenses together reduce the aberration of the system substantially to said same predetermined value; and
a relay lens section for forming a real image of an object from a light beam projected by said first or said second zooming section when optically coupled thereto and having lenses controlling the aberration of said relay lens section in such a way as to counteract aberration of said predetermined value resulting from said first or said second zooming section, whereby said real image is substantially free of aberration,
said first and second zooming sections being provided with supporting structure for optical coupling to said relay lens section such as to make them mutually interchangeable with respect to said relay lens section.

2. A zoom lens device according to claim 1, wherein said group of focusing lenses in said second zooming section is composed of at least a group of convex lenses and a group of concave lenses, said group of the concave lenses is formed of a glass having higher dispersibility than that of said group of convex lenses, and an aperture means is disposed at either the front side or the back side of said group of normally fixed lenses in said second zooming section.

3. A zoom lens device according to claim 1, wherein said group of normally fixed lenses in said second zooming section is movable frontward and backward.

4. A zoom lens device according to claim 1, wherein said group of variator lenses in said first zooming section includes at least one negative lens, and said group of variator lenses in said second zooming section has at least one negative lens and a negative meniscus lens with the concave surface being faced to the object side.

5. A zoom lens device according to claim 2, wherein said group of focusing lenses in said second zooming section has a biconvex lens including a doublet, and a positive meniscus lens disposed behind said biconvex lens.

6. A zoom lens device according to claim 2, wherein said group of focusing lenses in said first zooming section is composed of a group of concave lenses and a group of convex lenses, one of said concave lens group and said convex lens group for effecting the focusing operation comprises a concave lens and a convex lens behind said concave lens, and the curvature radius of the image-side surface of said concave lens is smaller than that of the object-side surface of said convex lens.

7. A zoom lens device according to claim 4, wherein said second zooming section is composed of at least a group of convex lenses and a group of concave lenses, said group of the concave lenses of said second zooming section is formed of a glass having higher dispersibility than that of said group of convex lenses of said second zooming section, and an aperture means is disposed at either the front side or the back side of said group of normally fixed lenses in said second zooming section, and wherein, further, said group of focusing lenses in said first zooming section is composed of a group of concave lenses and a group of convex lenses, one of said concave lens group and said convex lens group for effecting the focusing operation in said first zooming section comprises a concave lens and a convex lens behind said concave lens, and the curvature radius of the image-side surface of said concave lens is smaller than that of the object-side surface of said convex lens.

8. A zoom lens device according to claim 7, wherein said group of focusing lenses in said second zooming section has a biconvex lens including a doublet, and a positive meniscus lens disposed behind said biconvex lens.

* * * * *